United States Patent [19]

Ryon et al.

[11] Patent Number: 4,459,245

[45] Date of Patent: Jul. 10, 1984

[54] METHOD AND APPARATUS FOR CONTROLLED SIZE DISTRIBUTION OF GEL MICROSPHERES FORMED FROM AQUEOUS DISPERSIONS

[75] Inventors: Allen D. Ryon, Oak Ridge; Paul A. Haas, Knoxville, both of Tenn.; John S. Vavruska, Santa Fe, N. Mex.

[73] Assignee: The United States of America as represented by the United States Department of Energy, Washington, D.C.

[21] Appl. No.: 340,624

[22] Filed: Jan. 19, 1982

[51] Int. Cl.$^3$ .............................................. G21C 21/00
[52] U.S. Cl. ..................... 264/0.5; 252/635; 264/14
[58] Field of Search ............... 264/0.5, 14; 252/635

[56] References Cited

U.S. PATENT DOCUMENTS

| 3,313,602 | 4/1967 | Smith | 264/0.5 |
| 3,329,745 | 7/1967 | LaGrange | 264/0.5 |
| 3,586,742 | 6/1971 | Chin et al. | 264/0.5 |
| 3,617,585 | 11/1971 | Haas et al. | 252/635 |
| 3,888,787 | 6/1975 | Hein et al. | 252/635 |

FOREIGN PATENT DOCUMENTS

| 1578319 | 8/1969 | France | 264/0.5 |
| 1575300 | 9/1980 | United Kingdom | 264/0.5 |

OTHER PUBLICATIONS

Haas, P., 1970, Preparation of Sol-Gel Microspheres Smaller Than 200 Microns Without Fluidization, Nuclear Technology, vol. 10(3):283-292.

Kanij, et al., 1967, "Het Sol-Gel Proces," in Atomenenergie en haar Trepassingen, vol. 9(9):213-224, (English Translation).

Chen, et al., Gas-Liquid and Liquid-Liquid Dispersions in Kenics Mixer, Kenics Corporation, N. Andover, Massachusetts.

Karabelas, 1978, Droplet Size Spectra Generated in Turbulent Flow Pipe of Dilute Liquid-Liquid Dispersions, AIChE Journal, vol. 24(2):170-180.

Primary Examiner—Benjamin R. Padgett
Assistant Examiner—Howard J. Locker
Attorney, Agent, or Firm—Earl L. Larcher; Stephen D. Hamel; Michael F. Esposito

[57] ABSTRACT

The present invention is directed to a method and apparatus for making a population of dense, closely size-controlled microspheres by sol-gel procedures wherein said microspheres are characterized by a significant percentage of said population being within a predetermined, relatively narrow size range. Microsphere populations thus provided are useful in vibratory-packed processes for nuclear fuels to be irradiated in LWR- and FBR-type nuclear reactors.

6 Claims, 1 Drawing Figure

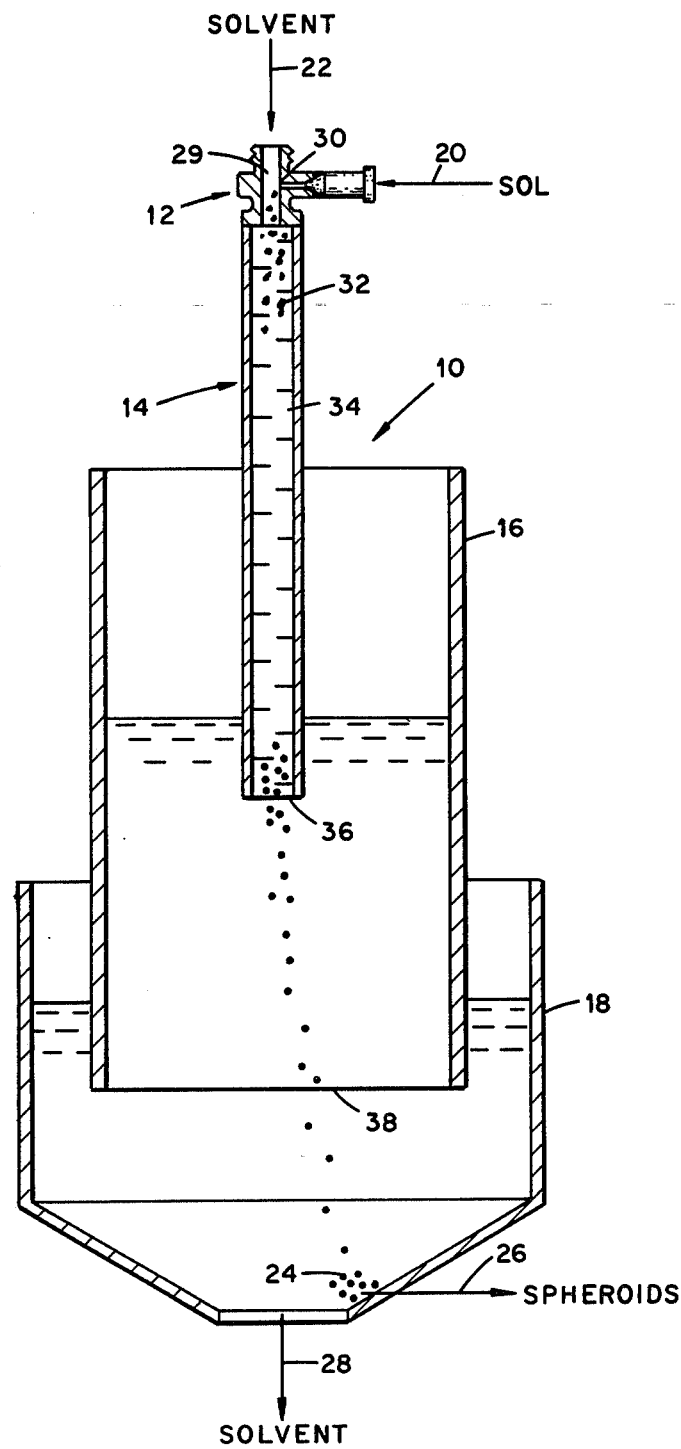

METHOD AND APPARATUS FOR CONTROLLED SIZE DISTRIBUTION OF GEL MICROSPHERES FORMED FROM AQUEOUS DISPERSIONS

This invention is a result of a contract with the U.S. Department of Energy.

BACKGROUND OF THE INVENTION

The present invention relates to an apparatus and method for controlling the size distribution of gel microspheres made from aqueous dispersions, i.e., sols or solutions that form sols, so that a majority of the microsphere population formed will be in a preselected and relatively narrow size range.

Current gel microsphere processes produce a product of wide variability in size range. This variability increases as microsphere diameter decreases, particularly for microspheres with diameters below 300 microns. Efforts to control this undesirable variability of size range of gel microspheres include the process described in commonly assigned U.S. Pat. No. 3,617,585 which issued Nov. 2, 1971 in the names of P. A. Haas and S. D. Clinton. Table II of the aforementioned patent shows an improved control in size range variability obtained by the process as compared to another sol-gel process. While this patented process provided a substantial improvement in narrowing the size-range distribution of microspheres, the reported scatter from mean diameter of these microspheres significantly detracted from the overall production efficiency and economics of said process because of unwarranted waste when applied to making microspheres requiring a narrow size-range variability of 300 microns or below.

One specific application having critical need for product microspheres of a narrow size-range variability is microspheres incorporating values of uranium, thorium, plutonium, and combinations thereof intended for vibratory-packed columns of nuclear reactor fuels. According to recent reports on diversion resistant processes for fuel refabrication, effective nuclear performance in such columns is attained by three size ranges of microspheres of approximately 40:10:1 diameter-to-diameter ratios. See, for example, W. J. Lackey, et al, "Assessment of Gel-Sphere-Pac Fuel For Fast Breeder Reactors", ORNL/TM-5468, Oak Ridge National Laboratory (1978) and P. A. Haas, et al, "Chemical Flowsheet Conditions For Preparing Urania Spheres By Internal Gelation", ORNL/TM-6850 (1979).

The foregoing technical reports provide detailed information about processes for gel microsphere formation from aqueous dispersions, subsequent treatment procedures, and ultimate loading into fuel columns for nuclear reactors and are, therefore, incorporated by reference. Additional applications for controlled microspheres exist in other fields such as structural ceramics and spherical catalysts.

The simplicity and adaptability of the present invention make it amenable to current uses of sol-gel processing such as remote operations for preparing nuclear fuels or wastes, and other uses mentioned above. Preferably, the subject method is carried out on a continuous basis to achieve commercial scale quantities, but batch processing of such quantities is also possible. Downtime for maintenance or replacement of components is substantially obviated by the simple design of the present invention as compared to the heretofore utilized formation devices.

An important aspect of our invention lies in the discovery that the wide size-range variability of prior art processes, such as above-described, for forming sol-gel microspheres can be explained by particle kinematics of droplets exposed to a turbulent-flow field controlled only by hydraulic action and surfactant additions. Classical fluid flow theory suggests three separate regions of flow behavior for well-developed flow. These are laminar flow at the walls, a transition layer of limited eddy activity adjacent thereto, and an inner turbulent core of violent eddy activity. Since hydraulic activity has been identified as controlling, it is apparent that droplets flowing therein will have variant operative forces of formation and hence different diameters.

The functional relationship between droplet and ultimate microsphere size in sol-gel processes has long been appreciated by the art. Heretofore, the principal approach to smaller droplets has been finer restrictions in orifices, capillaries or related openings in formation devices. These equipment modifications have done little to produce microspheres of narrow size-range variability. Increases in waste because of unacceptable product and even lower production rates of microspheres are characteristic of such modifications and are, therefore, undesirable.

Interfacial tension between the dispersed fluid and solvent of prior art processes is controlled by hydraulic action and addition of surfactant concentrations to the dispersion. Hydraulic action appears to be the more important of these, thus leading to the conclusion that droplet size is flow rate controlled with greater flow ($N_{re} > 200$) producing finer droplets. One researcher, A. J. Karabelas, in "Droplet Size Spectra Generated In Turbulent Pipe Flow Of Dilute Liquid/Liquid Dispersions", AIChE Journ., 24, pp. 170–180 (1978), AIChE, New York, N.Y., has even predicted droplet size based on Weber Number for water/petroleum-distillate dispersions.

Thus, there is a need for an improved and more efficient method and apparatus for producing close size-controlled microspheres of below 300 microns diameter while maintaining a high degree of the requisite uniformity essential for retentive strength and resistivity. The improved method and apparatus will produce microspheres of suitable size-range fields for direct deployment to the ultimate application thereby eliminating corrective procedures for removing defective portions or separating under and over-sized fractions of the final product. Of course, a significant increase in production volume and a marked decrease in waste will also follow.

SUMMARY OF THE INVENTION

Therefore, it is an object of the present invention to provide a simple, efficient method and apparatus for providing a population of dense, closely size-controlled microspheres characterized by a significant percentage of said population being within a predetermined and relatively narrow size range.

It is an additional object of this invention to provide such a method and apparatus suitable for producing, on a continuous basis, large scale quantities of microspheres characterized by the absence of pretreatment processes to enhance quality or particle-size uniformity.

These and other objects which will become apparent from reading this disclosure are achieved according to the present invention in a method for sol-gel formation of a product of gel microspheres, characterized by reduced size-range variability and greater uniformity, comprising the step of:

Passing an aqueous solution of at least one metal value and a water-immiscible organic liquid through a mechanically-induced turbulent zone to cause sufficient mechanical agitation of said solution to effect a homogeneous dispersion of substantially uniform-sized droplets thereof within said liquid.

In the practice of the subject invention, the techniques for selection or preparation of the aqueous dispersion containing metal values, or gelation agent are currently within the skill of the art and may be selected from such publications as ORNL/TM-6850, supra. While the mode disclosed hereinafter relates to the internal gelation mode of the sol-gel technology, the subject method and apparatus may be employed in other sol-gel modes such as external gelation or water extraction.

The term "microsphere" as used herein relates to a spheroidal particle, not necessarily a perfect sphere, which has a diameter below 300 microns.

BRIEF DESCRIPTION OF THE DRAWING

The single FIGURE is a schematic diagram of an apparatus for conducting the method of this invention.

DETAILED DESCRIPTION

In accordance with the present invention, a method and apparatus are provided for attaining a close size-controlled microsphere population by sol-gel procedures in which a significant percentage of microspheres are formed within a preselected and relatively narrow size range. The gel microsphere population is attained by subjecting aqueous dispersions of a sol, or solution that forms a sol, the dispersion containing at least one metal value, within a water-immiscible organic liquid to a highly uniform zone of mechanically induced turbulence.

Higher yields and a more precisely controlled variability of size-ranges can thus be attained by providing a more homogeneous and isotropic regime of turbulent flow within the microsphere-forming apparatus. This is accomplished in the present invention by incorporating within said apparatus a microsphere-forming column that contains one or more flow diverting structures which provide a zone of uniform, mechanically induced turbulence. This zone extends not only over the cross section of the column but along its entire length. The combination of flow-diverting structures and hydraulic turbulence in the gel microsphere-forming column subjects the dispersed fluid to more uniform forces of formation than previously provided by former devices. Our discovery that a marked improvement in the turbulent flow field of the formation device can thus be had is an important factor in limiting size-range variabilities of the microspheres produced by our invention to desired and relatively narrow variations of diameters of about 300 microns or below.

Typically, populations of these microspheres will have a significant percentage of the population (sometimes as high as 90%) within a preselected and relatively narrow size-range.

Similar populations could also be provided by a modified column having an internal construction of different mechanical means or flow-diverting structures such as tortuous passageways, rotating couettes, and like devices or their combinations. These variations are thus considered equivalents of this disclosure.

Referring to the figure in the accompanying drawing, the practice of our method utilizes a sol-gel microsphere-forming device 10 which is shown comprising a reactant feed nozzle 12, a microsphere-forming column 14, a gelation column 16, and a settling chamber 18. The aqueous feed of metal values into the nozzle 12 through conduit 20 may be a solution containing a dissolved metal salt, a suspension of fine metal oxide particles, or an aquasol of metal salt or oxide derived from conventional sources of such materials. Preferably, the aqueous feed contains at least one metal value and is admixed with sol-forming agents such as urea and hexamethylene-tetramine (HMTA) in sufficient proportions to effect gelation when exposed to heated media. The water-immiscible organic liquid feed shown generally at 22 may be any organic liquid, such as trichloroethylene (TCE), 2-ethyl-1-hexanol (2EH), iso-amyl alcohol (iAA). or like higher alcohols having a capacity for converting the droplets of the aqueous dispersion into an acceptable gelled product. Preferably. the organic liquid should be a dehydrating agent, maintained essentially free of water, and having a high affinity for removing water from the droplet product without a deleterious effect on gelation of the droplets. In short, the liquid utilized in the subject method should stabilize the droplet during the gelation process into a solid form without destruction of the physical or mechanical integrity of the droplet. Hydrocarbons and other organic liquids with low water solubilities and higher boiling points cannot impart the requisite properties to the droplet product. TCE can provide some dehydration, but some precautions must be taken in the drying portion of the process. The temperature of the entering solvent stream 22 may vary between 50° C. to 90° C. depending upon the sphere size, length of column 14, and other process parameters such as flow rate, number of flow diverting structures, column diameter, and composition of the aqueous dispersion. For purposes of conducting the present invention, an acceptable product has been easily obtained by utilizing 2EH at a temperature in the range of about 45° C. to 55° C. Temperatures much below about 45° C. are insufficient for practical decomposition of the gelation agent. Temperatures much above about 55° C. tend to produce gel properties unacceptable in subsequent steps such as washing.

While the angle of intersection 30 of the respective feeds 20 and 22 is depicted at right angles to one another in the drawing, such an angle is not essential and other sol-gel feed arrangements may be satisfactorily utilized. In the practice of our invention, we have used several different sizes and types of static mixers of varying length and pitch manufactured by Kenics Corporation of Andover, Mass. to provide the mechanically induced means for generating a turbulent zone 34 within the column 14. Basically. these mixers comprise a stainless-steel mixing element consisting of a staggered series of right-handed and left-handed helical elements joined together at right angles to one another and mechanically affixed to the inner walls of a rigid column. Fouling of feed material flow and surface wear are not a problem in the present invention since no small-diameter restrictions, moving parts, or inferior materials are utilized for producing our narrowly size-controlled microspheres.

Gelation of the feed materials is initiated as the dispersion is formed into droplets in column 14, continues in gelation column 16, and is completed in settler 18. Following aging for sufficient time to complete gelation which is usually in the range of about 0.1 to 0.5 hour, the spheroidal product 24 is removed from settler 18 through line 26 and separated from the liquid by conventional means such as filtration or screen collection. The water-contaminated liquid is drawn off through line 28. This stream is preferably recycled to feed stream 22 through a conventional azeotropic distillation process to remove water, but alternate means of disposal may also be utilized. Additional 2EH unsaturated with water may be added to the liquid feed as necessary to provide a liquid essentially free of water and characterized by a marked affinity for water extraction.

Recovered spheroids are subjected to such additional treatment as required for their ultimate use. Typical treatment may constitute washing and drying to remove impurities or volatile constituents followed by confinement within a reducing atmosphere and firing to elevated temperature under controlled conditions to reduce the metal values to a sintered and highly dense metal oxide product. Other treatment procedures known within the sol-gel art are possible and could be adapted to the subject method by application of only limited skill.

Exacting control and tedious monitoring procedures are not required in the practice of the present invention. Spheroids of different nominal sizes can be formed within the microsphere-forming column 14 of the present invention simply by selectively varying liquid properties or flow conditions such as flowrates, interfacial tension or density of feed materials, or process parameters like the dimensions of the turbulent mixing zone.

As mentioned hereinbefore, droplet sizes are flowrate controlled with increasing velocities in our microsphere-forming apparatus producing smaller spheroids. In addition to the example given below wherein approximately 90% of the sintered microspheres resided with the narrow size range of 15 to 45 microns, we have obtained similar results by using larger diameter columns 14. Customarily, the larger diameter spheres do not attain as great a degree of size-range control as that given for the example below, but populations of larger spheres still have a significant percentage of sintered spheroids within a relatively narrow range as compared to former sol-gel processes. For instance, in a run to produce such spheroids of a nominal 200 micron diameter, about 90% of the microspheres were found to be within the size range of 90 to 225 microns while in a similar run to produce a population of nominal 400 micron spheroids, about 85% of the microspheres were within the size range of 200 to 400 microns. Thus, the formation device of the present invention preferably is applied when making microsphere populations below about 300 micron spheroid diameters. Larger sizes are possible, but at the expense of diminished control over size-range variability. Subsequent experimentation has revealed that spheroidal sizes of about 1000 microns nominal diameter are limiting for the present invention. For spheroids above this size, typical sol-gel methods are just as competitive as the present invention for size-range control.

The following example is presented to illustrate an operable mode for carrying out the subject invention. Process conditions disclosed therein have not necessarily been optimized and are presented for the sole purpose of illustration of the invention in preparing close size-controlled microsphere populations having a significant percentage of said population within a preselected and relatively narrow size range.

EXAMPLE I

An aqueous dispersion for a sol-gel forming operation was prepared by combination of an acid deficient uranyl nitrate solution containing 2.6M $U^{+6}$ and 4.0M $NO_3^-$ with a 3.3M aqueous urea solution. A metered amount of the resultant mixture was introduced to a chilled tank and agitated for uniformity. The tank was maintained at about 0° C. to prevent premature gelling. A 3.1M hexamethylene tetramine (HMTA) solution was added to the tank with continued agitation and cooling at about 0° C. The final fluid dispersion had an HMTA to $U^{+6}$ molar ratio of 1.2.

Again referring to the drawing, this final fluid was injected at 25 ml/min. through line 20 of nozzle 12 where it was dispersed within a 300 ml/min. organic liquid stream of 2-ethyl-1-hexanol (2EH) introduced through line 22. The 2EH was admixed with a minute amount (about 0.1 wt. %) of Span-80, a surfactant product of Atlas Powder Co., Wilmington, Del., and heated to a temperature of about 50° to 55° C.

Lines 20 and 22 are interconnected by an internal passageway 29. Feeds of fluid dispersion and organic liquid are first contacted at point 30 whereby globules 32 are transported into the microsphere forming column 14 which contains a mechanically induced turbulent zone or region 34. A Kenics Static Mixer, Model 37-03-062 3/16 inches I.D. by 6 inches long was utilized to provide said zone. The alternating right-handed and left-handed helical elements of the mixing element of this device exposed the globules to a tortuous passage within column 14. Droplet sizes within this passageway are flowrate controlled and are found to follow the general equation.

$$\frac{D_s}{D_n} = 0.6 \left[ \frac{\sigma}{D_n V^2 \rho} \right]^{0.75}$$

where:
$D_s$ = droplet diameter
$D_n$ = nozzle internal diameter
$\sigma$ = interfacial tension of dispersed fluid and solvent
$V$ = total liquid velocity in nozzle
$\rho$ = density of mixed liquids From the above equation, appropriate operating conditions can be selected for other sol-gel dispersions in a flowing, continuous phase of organic liquid. Good agreement with the above equation may be expected across the range of about 5 to 1000 microns utilizing a Kenics Static Mixer.

Homogeneous and uniform partially gelled droplets, the majority (about 90%) of which are in a size range of about 50 to 180 microns in diameter, exit the turbulent zone through opening 36 and enter the gelation column 16 where gelation is completed. These gelled droplets then flow into the settler 18 through opening 38 where they were aged for about 0.1 hour to complete gelation. While the aging process may be conducted in a location remote from the sol-gel forming apparatus, the aging process under the specified conditions has been found to ameliorate the clustering and caking problems frequently experienced in making spheroids below about 300 microns.

Completely gelled spheroids were recovered through line 26 by conventional techniques and were washed in about 10 volumes of 0.5 M $NH_4OH$ followed by an isopropanol rinse. The spheres were then dried by confinement within an air environment and heating to about 250° C. The resultant free-flowing $UO_3$-bearing spheroids were reduced to $UO_2$-bearing spheroids of 99% theoretical density by confinement in a hydrogen environment and firing to about 1,600° C.

Examination of the ultimate product revealed that greater than 90% of the microspheres were of the nominal size range of 15 to 45 microns in diameter. They appeared to be uniform in structure and appearance while possessing a high degree of regularity. Surface defects, cracks, and other anomolies were not detected in their smooth surfaces. Spheroids of this precision, quality, and regularity are suitable for direct loading into FBR and LWR fuel columns as the finer portion of vibratory-packed fuels described above.

In subsequent testing, a production rate equivalent of up to about 550 g $UO_2$/hr was attained without any observable adverse effect on spheroid quality or size-control. Continuous recycle of 2EH was accomplished therein by azeotropic distillation of the organic liquid to effect water removal prior to use in a subsequent cycle of the subject process. It is expected that the present invention can be scaled to even larger capacities without detrimental effect to achieve the aforementioned efficient production of commercial quantities.

What is claimed is:

1. A method for controlling the size range distribution of a sol-gel prepared spheroidal product wherein the formed spheroids are in a diameter range up to about 300 microns and wherein about 90 percent of the spheroid population is selectively formed in a narrow predetermined size range within said diameter range, comprising the steps of admixing globules of an aqueous dispersion of at least one metal value and a sol-forming agent with a water immiscible organic liquid, introducing the admixture into a column having a series of right-handed helical elements joined together at right angles to one another and mechanically affixed to inner walls of said column to provide a tortuous passageway therethrough for mechanically inducing sufficient turbulence in the admixture for disrupting laminar flow of the admixture in the column and for subjecting said admixture to adequate uniform agitation throughout the cross section of the column to effect the formation of substantially uniform-sized droplets of the aqueous dispersion in the column, maintaining the droplets in said column under the influence of the agitation for a sufficient duration to initiate gelation of the droplets, and conveying the formed droplets into a gelation column containing the water-immiscible organic liquid to effect further gelation of the droplets and form said spheroids.

2. The method claimed in claim 1, wherein the metal value is a salt or oxide of uranium, thorium, plutonium, or combinations thereof.

3. The method claimed in claim 1, wherein the sol-forming agent is urea or hexamethylene-tetramine.

4. The method claimed in claim 1, wherein the water-immiscible organic liquid is trichloroethylene, 2-ethyl-1-hexanol or iso-amyl alcohol.

5. The method claimed in claim 1, including the additional step of selectively varying the flow rate of the admixture through the column having a tortuous passageway therethrough for selectively varying the size range distribution of the spheroids formed therein.

6. The method claimed in claim 5, wherein the step of selectively varying the flow rate of the admixture comprises increasing the velocity of the admixture through the column having a tortuous passageway therethrough for forming the majority of spheroids of smaller uniform size.

* * * * *